I. EASTWOOD.
PLOW.
No. 108,243.　　　　　　　　Patented Oct. 11, 1870.
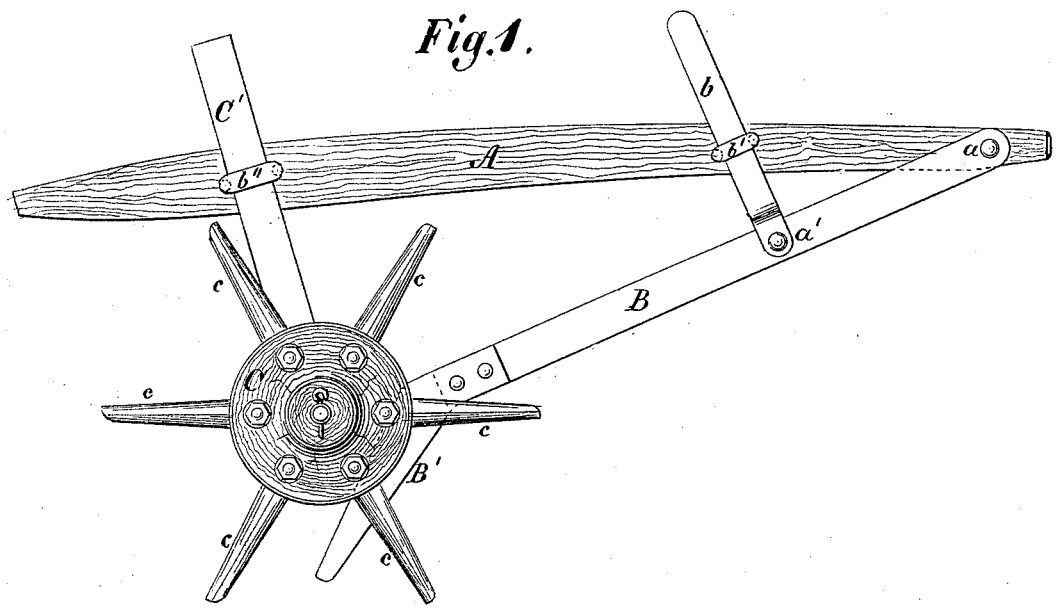
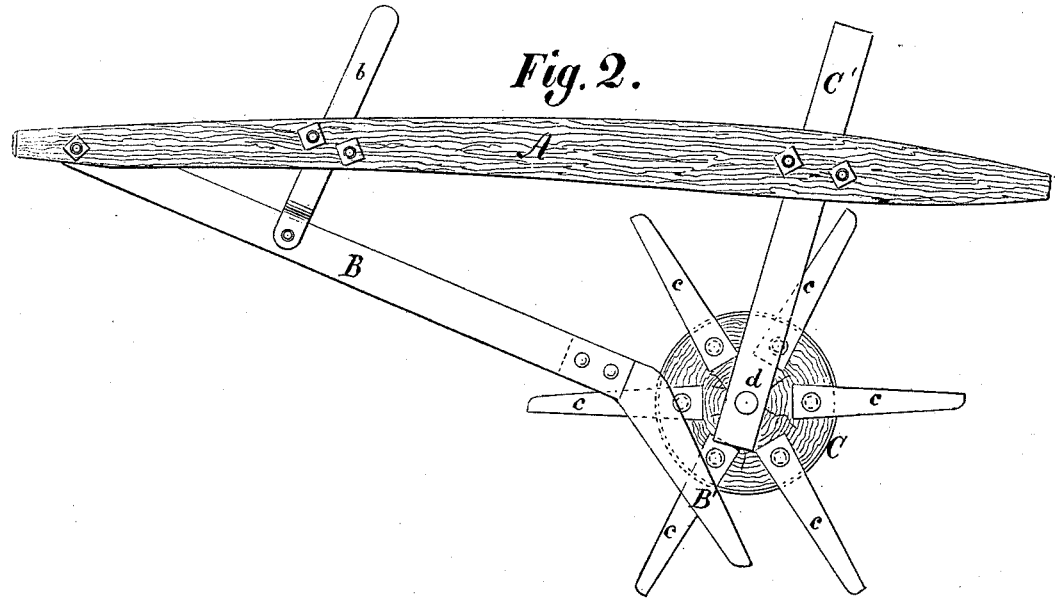
Witnesses:
John F. Fennell,
Henry N. Mygatt.
Inventor:
Isaac Eastwood
By Newton Crawford
his attorney

UNITED STATES PATENT OFFICE.

ISAAC EASTWOOD, OF LANARK, ILLINOIS.

IMPROVEMENT IN PLOWS.

Specification forming part of Letters Patent No. 108,243, dated October 11, 1870.

*To all whom it may concern:*

Be it known that I, ISAAC EASTWOOD, of Lanark, in the county of Carroll, in the State of Illinois, have made certain Improvements in Plows, of which the following is a specification.

The object of this invention is to produce a plow that will be sure to cut asunder all the weeds or stalks that may come in contact with the colter; and it consists in an adjustable revolving axis or hub, having radiating arms or cutters therein, that, as the plow is drawn forward, insert themselves into the ground, making the axle, with the hub and arms or cutters, to revolve, and, as they revolve in contact with the adjustable colter of the plow, cause all the weeds, stubble, or cornstalks that may gather in front of the colter to be cut in two by the colter.

In the drawings, Figure 1 represents the right-hand side view of my improvement, and Fig. 2 the left-hand view of the same.

A represents the ordinary beam of a plow. B is a long arm of the colter, pivoted to the plow-beam A at $a$, and has arm $b$ projecting upward and pivoted to B at $a'$. This arm $b$ passes through a screw staple or clamp, $b'$, in beam A, and by which means the arm B and colter B', at the back end thereof, is adjusted to go deep or shallow in the ground, as desired.

B' is the cutter or colter that, as is usual, precedes the standard and breast of a plow, and is rigidly and securely attached to arm B at its rear end, and serves to cut the furrow-slice from the land, as well as to cut in twain all stubble, weeds, and other substances that get in front of it. This colter or cutter B' is set to have its inclination toward the breast of the plow, and by which inclination it has a drawing cut, which will cause the stubble or substances that gather on its edge to be held upon the ground by the angular position of the edge of the colter with relation to the surface of the ground, and there be cut, instead of rising upon the colter to the under side of the beam, as is usually the case when the colter inclines in the other way.

C is a hub or disk that revolves freely on axis $d$, and has four or more radial arms or cutters, $c$, inserted into and flush with the face of the hub or disk that is next the colter B', and secured there by screw-bolts, and so arranged as that when the plow is drawn forward the arms or cutters penetrate the ground and cause the hub or disk to revolve, and as the plow with the inclined colter moves forward the arms or cutters $c$ are brought successively in contact with and pass along the edge of the colter in such manner that all stubble and weeds that accumulate forward of the colter must be cut in two, leaving that part on the land to remain till the next succeeding furrow is made, and that part lying on the furrow-slice being cut will be turned under by such furrow-slice into the bottom of the furrow. The hub or disk C, with its arms or cutters $c$, is adjusted to any desired position by means of the supporting bar C', which passes through a screw-clamp, $b''$, in the beam A of the plow. This bar C' also supports and allows the hub or disk to revolve freely upon axis $d$ by journaling the axis $d$ into bar C' at its lower end, while the bar is adjusted and held firmly in its place on beam A by the screw-clamp $b''$. The arms $c$ may or may not be brought to sharp cutting-edge on their forward side, as their office is more to hold the weeds or stubble while the sharp edge of the colter cuts them by their taking hold of the ground and holding the stubble while the moving colter cuts whatever is before it.

This construction and arrangement of the revolving disk having the radial arms, with the colter having a drawing cut, successfully does the work intended.

Having thus described my invention, what I claim, and desire to secure by Letters Patent, is—

The adjustable revolving hub or disk C, having projecting radial arms or cutters $c$, in combination with the adjustable backwardly-inclined colter B', when both are attached to and adjusted upon the beam A of a plow, in the manner and for the purpose shown.

ISAAC EASTWOOD.

Witnesses:
 EDM. F. BROWN,
 JNO. F. FENNEL.